March 10, 1942.   R. E. SPOKES   2,276,070
FRICTION ELEMENTS
Filed Aug. 31, 1939
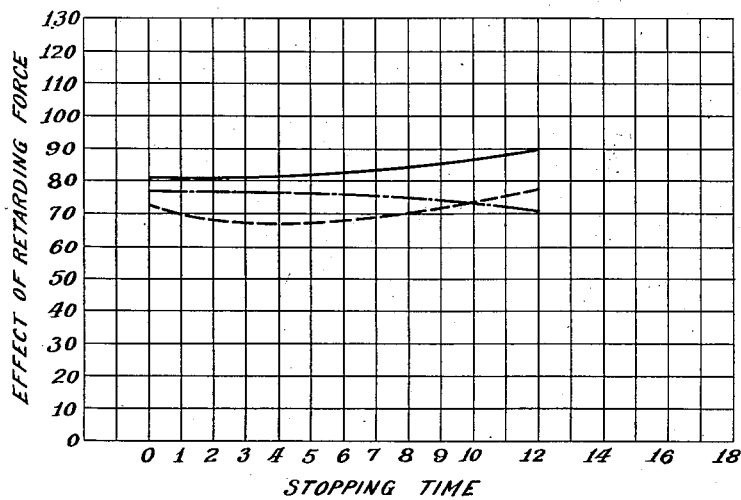
Inventor:
Ray E. Spokes
By Belt, Wallace and Cannon
Attorneys Patented Mar. 10, 1942

2,276,070

UNITED STATES PATENT OFFICE 2,276,070

FRICTION ELEMENT

Ray E. Spokes, Ann Arbor, Mich., assignor to The American Brake Shoe and Foundry Company, New York, N. Y., a corporation of Delaware Application August 31, 1939, Serial No. 292,792

15 Claims. (Cl. 260—763)

This invention relates to friction elements and the like and typically to composition friction elements such as are used in the brakes of automotive vehicles and as clutch facings or the like, this invention primarily pertaining to the inclusion of graphite in such elements and the like.

Graphite, usually in its most efficient form as a lubricant, namely flake graphite, has been employed heretofore in composition friction elements and the like and in such instances the lubricating effect of the graphite has been perceptible substantially throughout the operation of the elements and the like in their intended use. For example, in a braking operation entailing the use of a composition friction element, flake graphite is effective as a lubricant substantially throughout the entire braking operation and in such instances the lubricating effect may not always be desired, particularly during the initial part of the operation, for the usual desideratum is that the lubricating effect be appreciable during the later stages of the operation and a corresponding condition may be encountered in many other uses to which graphite-containing friction elements and the like may be put.

Thus, one of the primary objects of the present invention is to enable a lubricating effect to be realized in the course of a period of operation of a friction element or the like primarily when the need for such an effect arises and a related object is to accomplish this by the use of flake graphite.

One of the properties of flake graphite that is objectionable when it is employed in friction elements and the like is the tendency thereof to separate along lines of cleavage therein and this tendency seems to be proportionate to particle size for it is most marked in the larger particles of flake graphite, although, theoretically at least, such tendency is always present irrespective of particle size. In view of the fact that larger particles of flake graphite exhibit a relatively great tendency to separate along the lines of cleavage therein, which is exhibited by a tendency of portions of such particles to slip and slide relative to each other in more or less planar directions, attempts have been made to thoroughly disperse relatively fine particles of flake graphite throughout friction elements in those instances where the use of such graphite appeared to be desirable to control the friction of the elements. This has not been entirely satisfactory, however, for the reason that such dispersions of such relatively fine graphite particles has usually been too effective in that the friction has usually been reduced to a greater degree than desired.

It has also been found that certain difficulties are experienced when graphite, and particularly flake graphite, is used in relatively thick composition friction elements adapted for heavy duty service and this has been particularly noticeable when the graphite has been present in such elements in amounts of approximately five per cent or more by weight. The relatively thick friction elements in which these difficulties have sometimes been experienced are those which are used, for example, in the brakes of certain types of heavy trucks and busses and in similar severe service. It has been observed that these difficulties are particularly noticeable in heavy duty or relatively thick composition friction elements that are bonded with various types of resins, or with mixtures of rubber and resin, cured under heat and pressure. It is believed to be desirable to include in such heavy duty friction elements approximately five per cent or more by weight of graphite for the reason that when graphite is present in such friction elements, and particularly those bonded with resins or mixtures of rubber and resin, as aforesaid, in amounts substantially less than five per cent, the graphite has little, if any, effect upon the frictional or wearing properties of the elements.

Among the more serious difficulties encountered in relatively thick or heavy duty friction elements containing flake graphite, and which are bonded by resin or mixtures of rubber and resin, is that such elements sometimes exhibit a tendency to laminate or crack internally. This is believed to be due partly to the internal lubricating effect of the flake graphite attendant to the aforesaid tendency of such graphite to separate along the lines of cleavage therein and it is also believed that this effect promotes disintegration of the composition friction elements. Moreover, it may well be that flake graphite insulates the particles of the resin or rubber-resin bond employed in composition friction elements from each other whereby the particles of the bond are prevented from effectively performing their intended function of bonding the ingredients of the composition friction elements together. Furthermore, it is generally accepted that heat reactive phenolic resins of the molding type, commonly known as one-step or two-step resins, or mixtures of such resins with rubber and sulphur, ofttimes used as the bond for composition friction elements of the heavy duty type, undergo considerable flow during the heat and pressure cure to which such elements are subjected in the course of manufacture thereof. It appears, however, that flake graphite tends to cover particles of such a bond and this is believed to impair the desired internal flow during the heat and pressure cure with the result that proper bonding of the ingredients does not result and the effect of this is that the elements are sometimes weak structurally which is, of course, highly undesirable. Furthermore, entirely apart from the just described objectionable characteristics believed to be attributable to flake graphite, difficulty is sometimes experienced in properly bonding, that is, retaining flake graphite in composition friction elements.

Accordingly, another important object of the present invention is to overcome the above discussed and kindred difficulties which have sometimes been experienced in employing flake graphite in composition friction elements and the like and particularly, though not necessarily, those difficulties which have been encountered in relatively thick heavy duty elements and the like containing a resin or a rubber-resin bond.

While the use of flake graphite to control the friction and improve the wearing properties of composition friction elements and the like has been attempted heretofore it is, nevertheless, among the objects of this invention to employ such graphite in such elements and the like in a novel manner so that a particularly desired control of the friction of such elements and the like may be realized along with a marked improvement in the wearing properties thereof.

Yet other objects of this invention are to so include flake graphite in composition friction elements and the like that the difficulties arising from the tendency of particles thereof to slip and slide relative to each other will be overcome and an object ancillary to this is to enable relatively small particles of flake graphite, in which, as explained above, such tendency is materially restricted, to be employed in composition friction elements and the like without encountering those difficulties which have heretofore attended the use of such particles in such elements and the like.

Further objects of this invention are to bond together relatively small particles of flake graphite into agglomerates of a bond and such graphite that may be readily incorporated in composition friction elements and the like; to employ a bond in such agglomerates that will not only effectively retain the graphite but which will also readily unite with, to thereby be retained by, the bond or bonds employed in the composition friction elements and the like in which the agglomerates are employed, and to so compound the agglomerates of bond and flake graphite that, when the agglomerates are used in composition friction elements or the like having resin or rubber-resin bonds therein, the agglomerates will enhance rather than impair the effectiveness of the bonds of the elements or the like.

More specifically, among the objects of this invention are to disperse relatively small particles of flake graphite throughout a matrix of hard rubber to thereby afford rubber bonded agglomerates of flake graphite particles, and to produce such agglomerates in a novel manner.

Still another object is to incorporate flake graphite into both heavy duty or relatively thick friction elements and also into friction elements which are intended for lighter service, as for example, those adapted for use in the brakes of passenger automobiles, light trucks and the like, in such a way that the lubricating effect of such graphite will be perceptible primarily when the need therefor arises in the course of operations entailing the use of such elements, and an ancillary object is to impart to such friction elements, by the incorporation of flake graphite thereinto in the manner contemplated by this invention, an increased resistance to the heat to which such elements are subjected in use and also to enable such elements to exhibit a relatively high tendency to eliminate noise in the course of operations effected by the use of such elements.

Other and further objects of the present invention will be apparent from the following description and claims wherein the preferred embodiment of the present invention is disclosed as well as the principle thereof and what I now consider to be the best mode in which I have contemplated applying that principle. Other embodiments of the invention embodying the same or equivalent principle may be used and changes may be made as desired by those skilled in the art without departing from the present invention and the purview of the appended claims.

In the accompanying drawing I have shown typical friction curves of composition elements, one curve pertaining to a friction element which did not contain graphite, another to a friction element containing flake graphite in a conventional manner and the third to a friction element having flake graphite incorporated in accordance with the present invention.

In accordance with the present invention agglomerates of flake graphite bonded together by hard rubber are produced separately and such agglomerates are thereafter incorporated with other ingredients to afford composition friction elements or the like, as may be desired.

A suitable formula, in accordance with which agglomerates of rubber bonded flake graphite particles may be produced and in which all parts are indicated by weight, is the following:

*Formula No. 1*

| | Parts |
|---|---|
| Rubber | 15.0 |
| Solvent (petroleum naphtha) | 28.5 |
| Vulcanizing agents: | |
|     Sulphur | 3.0 |
|     Elementary selenium | 0.3 |
| Antioxidant (polymerized trimethyldehydroquinoline) | 0.3 |
| Flake graphite (97% passing 200-mesh screen) | 105.0 |

In preparing rubber bonded flake graphite agglomerates from the ingredients specified in the foregoing formula, the rubber is dissolved in the solvent to afford a cement into which the other ingredients specified are mixed, preferably in a mixer of the water-cooled kneader type, the mixing operation being continued for a period of about one hour and until a thorough intermixture of the ingredients is attained. This mixture is then removed from the mixer and formed into sheets, of about $\frac{5}{32}$" thick, in a conventional manner, and these sheets are then dried at a temperature of about 150° F. for a period of about twelve hours so as to substantially eliminate all of the solvent therefrom. The sheets are then, in a conventional manner, formed into thinner sheets of approximately $\frac{1}{16}$" in thickness and these sheets are then subjected to an open air cure at progressively increasing temperatures, so as to avoid blistering, substantially as follows: about two hours at approximately 180° F., about two hours at approximately 220° F., about two hours at approximately 250° F., about three hours at approximately 280° F., about three hours at approximately 300° F., and about three hours at approximately 310° F.

When this open air cure is completed the sheets are broken and ground in a suitable manner to a particle size such that the resulting agglomerates of hard rubber bonded flake graphite will for the most part pass through a 200-mesh screen but will be retained upon a 100-mesh screen.

It is to be noted that graphite particles of relative small size are specified in Formula No. 1, namely, of such size that ninety seven percent thereof will pass through a 200-mesh screen, it being understood that the remaining three percent will be of a particle size close to that specifically described, this specification as to particle size included in Formula No. 1 being one commonly employed in specifying such sizes. Furthermore, it will be noted that the graphite is to be thoroughly intermixed with the other ingredients and the result of this is that the various graphite particles in each agglomerate will have the planar lines of cleavage therein disposed indiscriminately relative to each other in the hard rubber matrix. This, coupled with the fact that the tendency of portions of relatively small graphite particles to slip and slide relative to each is limited, substantially eliminates from the agglomerates any tendency to exhibit the objectionable characteristics of flake graphite discussed hereinabove.

Moreover, since the agglomerates have a hard rubber matrix, the difficulties attendant to bonding flake graphite, and the effects of flake graphite on resin and rubber-resin bonds hereinabove explained, are overcome for the rubber matrix promotes rather than hinders the inclusion of flake graphite along with bonds of the aforesaid character.

It will, of course, be understood that variations from Formula No. 1 may be resorted to in producing graphite agglomerates such as those to which this invention pertains but in this regard there appears to be a minimum of rubber, based on a given area of graphite surface, which will satisfactorily bond the graphite particles together into agglomerates and at the same time satisfactorily bond the agglomerates to the other ingredients when the agglomerates of this invention are used in composition friction elements and the like in the manner, for example, explained hereinafter. This ratio appears to be about one part rubber for about seven parts graphite, of a density of 4.85 grams per cubic centimeter. With coarser graphite used in the manufacture of the agglomerates a slightly reduced ratio of rubber-to-graphite may be satisfactorily employed. However, a deficiency in rubber will prevent adequate bonding of the graphite particles into the desired agglomerates with the resulting failure of the agglomerates to remain intact and to adhere to the other ingredients during use of the friction element or the like in which they are included.

On the other hand, if the ratio of rubber-to-graphite substantially exceeds the ratio of about one part rubber to about seven parts graphite, in the absence of fillers which possess a relatively high surface area and which may be added, as presently explained, to increase the heat resistance of the agglomerates, then there is apt to be excessive swelling of the graphite agglomerates with a resulting objectionable smoke and odor formation when friction elements embodying such graphite agglomerates are subjected to the relatively high temperatures to which such friction elements, and especially friction elements adapted for heavy duty service, are subjected in use.

Furthermore, among the uses to which the agglomerates of this invention may be put there will be those where the degree of heat resistance possessed by the agglomerates will be important. In this regard I have found that the degree of heat resistance possessed by the agglomerates may be objectionably affected if the sulphur content of the agglomerates relative to the rubber content is substantially varied from the ratio of substantially twenty to forty percent of sulphur on rubber. The twenty percent ratio specified in Formula No. 1 has been found to impart sufficient heat resistance to agglomerates to render them suitable for use in composition friction elements subjected to heavy duty use.

While graphite agglomerates compounded in accordance with Formula No. 1 or variations thereof, such as will be apparent to one skilled in the art, will possess sufficient heat resistance to render them suitable for use in most of the usages to which composition friction elements of the kind containing such agglomerates will be put, there may be instances where a greater degree of heat resistance will be required. Such greater degree of heat resistance may conveniently be imparted to the agglomerates by incorporating therein the usual fillers employed to increase the heat resistance of rubber and among which are clay, blanc fixe and the like. While graphite agglomerates possessing such relatively high heat resistance may be compounded so as to include a variety of ingredients which will impart the desired degree of heat resistance, a typical formula which may be followed in compounding agglomerates possessing a high degree of heat resistance is the following, in which all parts are indicated by weight:

*Formula No. 2*

| | Parts |
|---|---|
| Rubber | 50.0 |
| Sulphur | 15.0 |
| Zinc oxide | 2.5 |
| Rubber accelerator (elementary selenium) | 1.0 |
| Flake graphite (97% passing 200-mesh screen) | 175.0 |
| Blanc fixe | 57.5 |

Graphite agglomerates of the kind to which this invention pertains may be compounded from the ingredients specified in Formula No. 2 in the manner hereinabove explained with reference to Formula No. 1 and those comments with respect to the ingredients included in Formula No. 1, and the relative quantities thereof that may be employed, apply with equal force to the ingredients specified in Formula No. 2. It should be noted that the ratio of rubber to graphite specified in Formula No. 2 is twice the minimum ratio hereinabove explained. Such ratio will be satisfactory for agglomerates in which a high degree of heat resistance is desired, particularly when ingredients for imparting heat resistance, such as the blanc fixe specified in Formula No. 2, are employed because of the relatively high surface area thereof.

As will be understood by those skilled in the art, the graphite agglomerates of this invention are capable of a wide variety of uses. However, the use thereof in composition friction elements is typical and especially the use thereof in composition friction elements adapted for relatively heavy duty service, as in the brakes of a heavy truck or bus. Such friction elements may, for example, be compounded in accordance with the following formula, in which all parts are indicated by weight:

*Formula No. 3*

| | | |
|---|---|---|
| Rubber | parts | 7.5 |
| Phenolic aldehyde type resin | do | 8.5 |
| Sulphur | do | 3.0 |
| Litharge | do | 2.0 |
| Metallic lead | do | 6.0 |
| Blanc fixe | do | 15.0 |
| Thermatomic carbon black | do | 5.0 |
| Asbestos | do | 37.5 |
| Accelerator (elementary selenium) | do | 0.17 |
| Antioxidant (polymerized trimethyldehydroquinoline) per cent of rubber content | | 2 |
| Flake graphite as such | parts | 2.0 |
| Graphite agglomerates | do | 6.3 |

Inasmuch as this invention does not primarily pertain to the production of composition friction elements, a detailed description of the manner in which friction elements are compounded from the ingredients specified in Formula No. 2 is not included herein for the manner in which this would be effected is more or less conventional and well understood in the art. It should be noted, however, that friction elements compounded from the ingredients specified in Formula No. 3 will be subjected to a heat and pressure cure in the course of which, as explained hereinabove, flow of the bond occurs whereby the bond covers and adheres to the other ingredients among which, of course, will be the graphite agglomerates specified in Formula No. 3. While, as explained hereinabove, it is sometimes difficult, in a heat and pressure cure, to effectively cover and thereby bond flake graphite, particularly when such graphite is present in such quantities of more than five per cent by weight of the entire composition, no such difficulty is encountered in bonding the quantity of graphite agglomerates specified in Formula No. 3 for the reason that the bond for the elements will effectively adhere to the hard rubber matrix of the graphite agglomerates. Hence, since the flake graphite is effectively bonded in the hard rubber matrix of the graphite agglomerates it likewise will be effectively bonded in the friction elements produced from the ingredients specified in Formula No. 3.

Formula No. 3 includes a relatively small quantity of flake graphite, as such, but it is to be noted that the quantity of flake graphite so specified is less than that which it has heretofore been customary to include in friction elements of the kind containing ingredients such as are specified in Formula No. 3. Such flake graphite is included in this formula for the purposes of control, which is to say, it enables a desired coefficient of friction to be realized during the use of the composition friction elements for, as is well understood in the art, it is necessary that the coefficient of friction be related to the use to which the elements are to be put and it is customary in the art to include in composition friction elements a lubricant, such as flake graphite, to adjust the coefficient of friction and thereby enable a particular desired coefficient of friction to be realized.

It should also be noted that the quantity of flake graphite specified in Formula No. 3 is less than that which it has been found to be difficult to bond in friction elements of the kind that may be produced from the ingredients specified in Formula No. 3 and hence such use of such graphite will not be detrimental.

The graphite agglomerates to which this invention pertains will not only produce desirable results in relatively thick friction elements especially adapted for heavy duty service, and of which composition friction elements compounded from the ingredients specified in Formula No. 3 are exemplary, for the use of the graphite agglomerates of the present invention has been found to be quite advantageous in composition friction elements adapted for lighter service such as on passenger cars and comparatively light trucks. Friction elements of this character may be compounded in accordance with the following formula, in which all parts are indicated by weight:

*Formula No. 4*

| | | |
|---|---|---|
| Rubber | parts | 7.5 |
| Phenol aldehyde resin | do | 6.0 |
| Sulphur | do | 3.5 |
| Litharge | do | 2.5 |
| Blanc fixe | do | 10.0 |
| Lead | do | 10.0 |
| Rubber accelerator (elementary selenium) per cent of rubber content | | 2 |
| Rubber antioxidant (polymerized trimethyldehydroquinoline) | parts | 0.17 |
| Asbestos fiber | do | 50.0 |
| Graphite agglomerates | do | 1.5 |

Here again, because this invention does not primarily pertain to the production of composition friction elements, a detailed description of the manner in which friction elements are compounded from the ingredients specified from Formula No. 4 is not included herein particularly since this would be effected in a more or less conventional manner which is well understood in the art.

One important advantage of using the graphite agglomerates of this invention in composition friction elements such as may be compounded either from the ingredients specified in Formula No. 3 or Formula No. 4 is that the hard rubber matrix of the agglomerates readily unites with the bonds employed in such friction elements and particularly resin and rubber-resin bonds. Moreover, while flake graphite, as such, may sometimes impair the flow of the bonds of the friction elements in the course of the cure thereof, it appears that the agglomerates of the present invention facilitate such flow, this probably being a function of the rubber included in the agglomerates.

Furthermore, graphite agglomerates embodying a ratio of vulcanized hard rubber to graphite, substantially as above specified, overcome the tendency of friction elements, and especially relatively thick friction elements adapted for heavy duty service, to crack or laminate internally. Additionally when graphite agglomerates of this invention are used in composition friction elements in proportions relative to the other ingredients such as are exemplified in Formulae Nos. 3 and 4, it has been found that highly desirable anti-squeal properties are imparted to the elements without objectional reduction in the friction characteristics thereof, and moreover the wear properties of the friction elements are improved.

However, perhaps the most important advantage accruing from the use of graphite that is bonded, as above described, prior to the inclusion thereof with the other ingredients from which composition friction elements are compounded, which is to say, graphite in the form of agglomerates such as those to which this invention pertains, is that the effect realized from the use of such bonded graphite is appreciable primarily at the time when the need for the lubricating effect to be realized from the flake graphite is greatest. Thus, in a braking operation effected by the use of a composition friction element including the graphite agglomerates of the present invention, the lubricating effect just referred to will be most appreciable during the latter portions of the stop or braking operation, when the need therefor is greatest, and the appreciation of a lubricating effect at this time enables a smooth and otherwise more satisfactory stop to be effected than would otherwise be realized.

It is believed that this beneficial result accrues because the rubber matrices of the graphite agglomerates somewhat soften when subjected to heat and when this occurs the flake graphite included in the agglomerates will be more effective than it is prior to the time the matrices so begin to soften. Inasmuch as the matrices of the graphite agglomerates of this invention are afforded by hard rubber, it will be apparent that comparatively high temperatures will need be encountered before the aforesaid softening will accrue.

Such comparatively high temperatures will be encountered during the latter portion of the braking operation for the reason that, as is well understood in the art, considerable energy is dissipated in the form of heat in the course of a braking operation and the result of such dissipation of heat during a braking operation is a gradual increase in temperature as the operation proceeds. The hard rubber matrices of the agglomerates of this invention are sufficiently heat resistant, either when compounded in accordance with Formula No. 1 or when compounded in accordance with Formula No. 2, to effectively resist the temperatures encountered in the early stages of a braking operation but since, as explained above, the temperature tends to increase as the operation progresses, it follows that the aforesaid softening of the matrices, to enable the flake graphite contained in the agglomerates to become effective, will be in substantially direct proportion to the need for the lubricating effect that can be realized from such flake graphite.

As a further explanation of the foregoing, attention is directed to the accompanying drawing wherein the full line on the graph is the typical friction curve of a composition friction element in which no graphite has been included. It will be noted that the friction of this element increases as the operation progresses and the result of this is that the friction is highest in the latter portions of the operation at which time a decrease rather than an increase in friction is desired, for, as explained above, this enables the realization of a smooth and otherwise more satisfactory stop or braking operation.

Still further, the broken line (— —) on the graph is the typical friction curve of a composition friction element identical in all respects to that to which the full line curve pertains except that this friction element contains that quantity of flake graphite, as such, which it has been customary to include in composition friction elements. By referring to this curve, it will be seen that first of all the initial friction of the friction element is materially lower than that of the element when it does not contain any graphite. Moreover, the flake graphite, as such, acts as a lubricant substantially throughout the entire braking operation and it acts to decrease the friction, but it will be noted that the effect of the flake graphite as such tends to depreciate rather than increase in the latter portions of the stop or braking operation which, of course, is contrary to the usual desideratum.

Still further, the dot-dash line (— — —) on the graph pertains to a composition friction element identical in all respects to those to which the full and broken lines pertain except that this composition friction element contained graphite agglomerates of this invention that included a quantity of graphite substantially equal to that included in the composition friction element to which the broken line pertains. By referring to this curve it will be seen that the presence of such bonded graphite but slightly affects the initial friction of the composition friction element but it will be noted that the effectiveness of the flake graphite in this instance gradually increases as the operation proceeds which, as has been explained, is the desideratum in such instances.

It is believed that it will be apparent from the foregoing description that I am enabled to utilize flake graphite in composition friction elements and the like in such a way that those difficulties, which have heretofore been encountered when attempts have been made to use such graphite in such elements, are avoided. But not only is this advantage realized but also the realization of the usual desideratum in the use of composition friction elements and the like is enabled by reason of the fact that when flake graphite is incorporated in such elements in accordance with the foregoing disclosure it becomes effective at those times when the need therefor is greatest.

While hard rubber has been specified hereinbefore as the preferred matrix for the graphite agglomerates, soft rubber may also be used, in some instances. Likewise, a suitable resin or resins may also, in some cases, be used as the matrix for the graphite agglomerates.

While hereinabove I have set forth formulae for composition friction elements adapted either for heavy duty or lighter service, it is to be understood that these formulae are merely exemplary of formulae from which the composition friction elements may be compounded and in which the novel graphite agglomerates produced in the manner above described, or in an equivalent manner, can advantageously be used. It is therefore to be understood that while I have illustrated and described preferred embodiments of my invention, it is to be understood that these are capable of variation and modification and I therefore do not wish to be limited to the precise details set forth but desire to avail myself of such changes and alterations as fall within the purview of the following claims.

I claim:

1. A friction element containing friction material, a bond, and agglomerates of graphite particles, each of said agglomerates containing a multiplicity of graphite particles bonded together by rubber prior to being mixed with the friction material and bond, each of said agglomerates containing a sufficient quantity of rubber to keep said agglomerates substantially intact and to bond said agglomerates to other ingredients in said friction element.

2. A friction element containing friction material, a bond, and agglomerates of graphite particles, each of said agglomerates containing a multiplicity of relatively small flake graphite particles bonded together by hard rubber prior to being mixed with said friction material, each of said agglomerates containing sufficient hard rubber to keep said agglomerate substantially intact and to bond said agglomerate to the other ingredients in said friction element.

3. A relatively thick or heavy duty friction element comprising as initial ingredients thereof a mixture of asbestos, a resin bond, and agglomerates of graphite particles, each of said agglomerates containing a multiplicity of graphite particles bonded together by means of rubber prior to being mixed with said asbestos and said bond, the rubber and the graphite particles being present in said agglomerates in a ratio of not substantially less than one part of rubber to seven parts of graphite, by weight.

4. A relatively thick or heavy duty friction element comprising as initial ingredients thereof a mixture of asbestos, a resin bond, and agglomerates of graphite particles, each of said agglomerates containing a multiplicity of graphite particles bonded together by vulcanized hard rubber prior to being mixed with the asbestos and bond, each of said agglomerates containing a sufficient quantity of vulcanized hard rubber to keep said agglomerate substantially intact and to bond said agglomerate to the other ingredients in said friction element.

5. A relatively thick or heavy duty friction element comprising as initial ingredients thereof a mixture of asbestos, a rubber resin bond, and agglomerates of graphite particles, each of said agglomerates containing a multiplicity of graphite particles bonded together by vulcanized hard rubber prior to being mixed with the asbestos and bond, each of said agglomerates containing sufficient vulcanized hard rubber to keep said agglomerate substantially intact and to bond said agglomerate to the other ingredients in said friction element.

6. A friction element containing friction material, a bond, and agglomerates of graphite particles, each of said agglomerates containing a multiplicity of graphite particles bonded together by hard rubber prior to being mixed with said friction material, the rubber and the graphite particles being present in said agglomerates in the ratio of at least about one part of rubber to about seven parts of graphite, by weight.

7. A friction element containing friction material, a bond, and agglomerates of graphite particles, each of said agglomerates containing a multiplicity of graphite particles bonded together by hard rubber prior to being mixed with said friction material and containing initially about twenty per cent of sulphur, by weight, each of said agglomerates containing sufficient hard rubber to keep said agglomerate substantially intact and to bond said agglomerate to the other ingredients in said friction element.

8. In the art of making friction elements, the improvement which comprises forming agglomerates of graphite particles each containing a multiplicity of graphite particles bonded together by rubber in a quantity sufficient to keep said agglomerate substantially intact and to bond said agglomerate to the other ingredients in a friction element, and then mixing said agglomerates with friction material and a bond and forming a friction element therefrom.

9. In the art of making friction elements, the improvement which comprises forming agglomerates of graphite particles each containing a multiplicity of graphite particles bonded together by rubber in the initial ratio of at least about one part of rubber to about seven parts of graphite by weight, and then mixing said agglomerates with friction material and a bond and forming a friction element therefrom.

10. The method of making a friction element which comprises forming agglomerates of graphite particles bonded together by means of rubber and in each of which agglomerates the rubber and graphite particles are present in a ratio of not substantially less than one part of rubber to seven parts of graphite, by weight, mixing said agglomerates with friction material and a bond, then forming the mixture of friction material, bond and graphite agglomerates into suitable shapes, and thereafter curing the bond.

11. The method of making a friction element which comprises forming agglomerates of graphite particles each containing a multiplicity of graphite particles bonded together in a matrix of hard rubber and each of which agglomerates contain sufficient hard rubber to keep said agglomerate substantially intact and to bond said agglomerate to the other ingredients in the friction element, mixing said agglomerates with friction material and a bond, then forming the mixture of friction material, bond and agglomerates into suitable shapes, and thereafter curing the bond.

12. A method of making a graphite-rubber agglomerate which comprises thoroughly intermixing graphite particles, rubber, a vulcanizing agent and a solvent and wherein the graphite and the rubber are present in a ratio of not substantially less than one part of rubber to seven parts of graphite, by weight, forming the mixture into sheets, heating said sheets to remove the solvent therefrom, reducing the thickness of the sheets from which the solvent is so removed, then heating such sheets to vulcanize the rubber into hard rubber, and then breaking up the resulting sheets into relatively small agglomerates of hard rubber and graphite.

13. The method of making graphite-rubber agglomerates which comprises thoroughly intermixing graphite particles, rubber, a vulcanizing agent, and a solvent and wherein the graphite and the rubber are present in a ratio of not substantially less than one part of rubber to seven parts of graphite, by weight, forming the mixture into sheets about $\tfrac{3}{32}''$ thick, heating said sheets at a temperature of about 150° F. for a period of about 12 hours to remove the solvent therefrom, forming said sheets from which the solvent has been so removed into thinner sheets about $\tfrac{1}{16}''$ thick, then heating said thinner sheets to vulcanize the rubber into hard rubber, and then breaking up the resulting sheets into relatively small agglomerates of hard rubber and graphite.

14. The method of making graphite-rubber agglomerates which comprises thoroughly intermixing graphite particles, rubber, a vulcanizing agent and a solvent and wherein the graphite and the rubber are present in a ratio of not substantially less than one part of rubber to seven parts of graphite, by weight, forming the mixture into sheets about $\frac{5}{32}$" thick, heating said sheets at a temperature of about 150° F. for a period of about 12 hours to remove the solvent therefrom, forming said sheets from which the solvent has been so removed into thinner sheets about $\frac{1}{16}$" thick, then heating said thinner sheets at progressively increasing temperatures, as follows: about 2 hours at about 180° F.; about 2 hours at about 220° F.; about 2 hours at about 250° F.; about 3 hours at about 280° F.; about 3 hours at about 300° F.; and about 3 hours at about 310° F. to vulcanize the rubber into hard rubber, and then breaking up the resulting sheets into relatively small agglomerates of hard rubber and graphite.

15. The method of making graphite-rubber agglomerates which comprises thoroughly intermixing graphite particles, rubber, a vulcanizing agent and a solvent and wherein the graphite particles are present in the ratio of at least about one part of rubber to about seven parts of graphite, by weight, forming the mixture into sheets of predetermined thickness, heating the sheets thus formed to remove the solvent therefrom, forming the sheets from which the solvent is so removed into thinner sheets, heating such thinner sheets to vulcanize the rubber, and then breaking up the resulting sheets into particles of a size somewhat larger than the graphite particles contained therein.

RAY E. SPOKES.